United States Patent
Kellstrom et al.

(10) Patent No.: US 9,784,309 B2
(45) Date of Patent: Oct. 10, 2017

(54) ANGULAR CONTACT SELF-ALIGNING TOROIDAL ROLLING ELEMENT BEARING

(71) Applicants: Magnus Kellstrom, Partille (SE); Arne Lars Jonas Kullin, Landvetter (SE); Andreas Lofqvist, Göteborg (SE)

(72) Inventors: Magnus Kellstrom, Partille (SE); Arne Lars Jonas Kullin, Landvetter (SE); Andreas Lofqvist, Göteborg (SE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/932,257

(22) Filed: Nov. 4, 2015

(65) Prior Publication Data
US 2016/0138648 A1  May 19, 2016

(30) Foreign Application Priority Data
Nov. 13, 2014  (SE) .................................... 1451353

(51) Int. Cl.
*F16C 23/04* (2006.01)
*F16C 23/08* (2006.01)
*F16C 19/36* (2006.01)

(52) U.S. Cl.
CPC ............ *F16C 23/084* (2013.01); *F16C 19/36* (2013.01); *F16C 23/08* (2013.01)

(58) Field of Classification Search
CPC ...... F16C 23/08; F16C 23/082; F16C 23/084; F16C 23/086; F16C 23/088
See application file for complete search history.

(56) References Cited

U.S. PATENT DOCUMENTS 3,990,753 A * 11/1976 Kellstrom ............... F16C 19/52
384/450
6,709,164 B2 * 3/2004 Takemura ............. F16C 19/364
384/450

FOREIGN PATENT DOCUMENTS

| DE | 19704909 A1 | 8/1998 |
|---|---|---|
| DE | 20111647 U1 | 10/2001 |
| DE | 102007021523 A1 | 8/2008 |
| EP | 1160469 A2 | 12/2001 |
| EP | 129623 A1 * | 10/2002 |
| EP | 2871376 A1 | 5/2015 |
| EP | 2871377 A1 | 5/2015 |

(Continued)

OTHER PUBLICATIONS

Definition of toroidal bearing, SKF website "CARB toroidal roller bearings" (http://www.skf.com/us/products/bearings-units-housings/roller-bearings/carb-toroidal-roller-bearings/index.html), obtained Nov. 18, 2016.*

*Primary Examiner* — James Pilkington
(74) *Attorney, Agent, or Firm* — Bryan Peckjian; SKF USA Inc. Patent Dept.

(57) ABSTRACT

An angular contact self-aligning toroidal roller bearing comprising an inner ring, an outer ring, and a set of rolling elements formed of rollers arranged in an intermediate configuration between the inner and outer rings. Each roller is arranged to self orient in its axial direction in relation to the inner and outer rings in a loaded zone during operation. Furthermore, a method for determining dimensional parameters of structural members of an angular contact self-aligning toroidal rolling element bearing and a method for manufacturing an angular contact self-aligning toroidal rolling element bearing are described herein.

13 Claims, 3 Drawing Sheets

(56) References Cited

FOREIGN PATENT DOCUMENTS

| | | | |
|---|---|---|---|
| GB | 2112085 | A | 7/1983 |
| GB | 2311568 | A | 10/1997 |
| KR | 20100038916 | A | 4/2010 |
| WO | 9617179 | A1 | 6/1996 |
| WO | 9835168 | A1 | 8/1998 |
| WO | 2014031054 | A1 | 2/2014 |

* cited by examiner

ANGULAR CONTACT SELF-ALIGNING TOROIDAL ROLLING ELEMENT BEARING

CROSS REFERENCE TO RELATED APPLICATION

This is a Non-Provisional Patent Application, filed under the Paris Convention, claiming the benefit of Sweden (SE) Patent Application Number 1451353-5, filed on 13 Nov. 2014, which is incorporated herein by reference in its entirety.

FIELD OF THE INVENTION

The present invention relates to rolling element bearings.

More specifically, the present invention relates to an angular contact self-aligning toroidal roller bearing comprising an inner ring, an outer ring, and a set of rolling elements formed of rollers arranged in an intermediate configuration between the inner and outer rings. The present invention also relates to a method for determining dimensional parameters of structural members of an angular contact self-aligning toroidal rolling element bearing and to a method for manufacturing an angular contact self-aligning toroidal rolling element bearing.

BACKGROUND ART

In a typical application, a rolling bearing arrangement may be arranged to accommodate misalignment, shaft deflections and thermal expansion of the shaft. To cope with misalignment and shaft deflections, design engineers conventionally use a self-aligning bearing arrangement consisting of two self-aligning ball bearings or two spherical roller bearings. However, thermal expansion of the shaft is a complex issue and one of the bearings is often arranged as a "locating" bearing and the other as a "non-locating" bearing. For example, the locating bearing may be secured in the housing and on the shaft and the non-locating bearing may be arranged to be able to move axially on its seat in the housing. However, the movement in relation to the housing of the non-locating bearing moves typically generates a considerable amount of friction, which then induces vibration, axial forces in the bearing system, and heat—all of which can significantly reduce bearing service life.

For various applications, a known solution involves utilizing a toroidal rolling element bearing, which is a self-aligning radial bearing having an inner ring that moves independently of the outer ring, enabling e.g. thermal elongation and contraction of the shaft or structure due to temperature variations without inducing internal axial loads. Furthermore, since the inner and outer rings of a toroidal roller bearing can be mounted with an interference fit, problems associated with a loose outer ring, such as fretting corrosion and distortion of the ring may be avoided.

However, for applications involving thrust loads, design engineers are required to coop with high axial loads, misalignment and shaft deflections. Known solutions and design rules suffer from resulting bearing arrangements having low design freedom, are expensive and over dimensioned.

SUMMARY OF THE INVENTION

In view of the above-mentioned and other drawbacks of the prior art, a general object of the present invention is to provide an angular contact self-aligning toroidal rolling element bearing, improved method for determining dimensional parameters of structural members of an angular contact self-aligning toroidal rolling element bearing, and an improved method for manufacturing an angular contact self-aligning toroidal rolling element bearing.

These and other objects are met by the subject matters provided in the independent claims. Preferred embodiments of the invention are presented in the dependent claims.

According to a first aspect thereof, the present invention relates to an angular contact self-aligning toroidal rolling element bearing, comprising an inner ring, an outer ring, and a set of rolling elements formed of rollers arranged in an intermediate configuration between the inner and outer rings, wherein each roller has a curved raceway-contacting surface arranged for being in load carrying contact with a curved inner raceway of the inner ring and in load carrying contact with a curved outer raceway of the outer ring, a contact angle between each roller and the inner and/or outer raceway is inclined in relation to a bearing axis, and wherein each roller is arranged to self orient in its axial direction in relation to the inner and outer rings in a loaded zone during operation.

The invention is based on the realization by the inventors that bearing system in applications involving high axial loads, misalignment and shaft deflections may be considerably improved by providing an angular contact self-aligning toroidal roller bearing being designed which focus on allowing for self orientation of the rollers, also referred to as a soap effect. This allows for more compact and efficient bearing solutions. In more detail, this approach allows for more compacts bearings, which in turn allow for reductions of load capacity over-dimensioning and dimensional over-dimensioning of the bearing system. Thereby, more compact bearing solutions, requiring less material and manufacturing resources, such as time, material, transport, etc., may be used for achieving similar or better performing bearings for a particular application involving e.g. high axial loads, misalignment and shaft deflections.

According to an embodiment, conventional design rules relating to non-angled toroidal rolling element bearings may be omitted when designing the angular contact self-aligning toroidal roller bearing. In other words, only the axial self-orientation criteria, also known as the soap effect criteria, is used for determining the optimum bearing design.

Furthermore, for various applications, an angular contact self-aligning toroidal roller bearing according embodiments of the present invention, allows for e.g. safer, more optimized designs, extended bearing service life, extended maintenance intervals, lower running temperature, lower vibration and noise levels, greater throughput of the machine, same throughput with a lighter or simpler machine, improved product quality/less scrap, etc.

According to an exemplifying embodiment, the angular contact self-aligning toroidal bearing is a large bearing. A large rolling bearing is for example a bearing having an external diameter of 500 mm or more.

According to an exemplifying embodiment, each roller is arranged to orient itself in its axial direction in relation to the inner and outer ring based on changing running conditions of the bearing. For example, during the changing running conditions involving misalignment of the structural members of the bearing, load changes, for example entering and leaving the loaded/unloaded zone, or ring deformations, displacements or twistings, etc. By axial self-orientation of the rollers, self-balancing is achieved leading to symmetric stress distributions and the avoiding of unfavorable roller edge loading under typical running conditions.

According to an exemplifying embodiment, the curvature of the curved raceway-contacting surface of each roller and the curvature of the inner and outer raceways are adapted to allow for self-orientation of the rollers in the axial direction of the rollers.

According to various exemplifying embodiments, each roller has a roller transverse radius 'rw' and a roller length 'lw', and a ratio between the roller transverse radius and roller length, for each roller, is less than 12, or is less than 10, or less than 8.5, or less than 6, or less than 4. The ratio between the roller transverse radius and roller length is characteristic for soap effect capability, i.e. the self-orientation capability of the rollers in their axial direction during changing running conditions. It may be determined based on the roller-raceway friction. In more detail, the roller transverse radius 'rw' to roller length 'lw' ratio is characteristic for the slope angle of the raceway-contacting surface of the roller and the slope of the raceway close to the axial ends of the roller. The relationship between the slope and a friction based angle influences the self orientation via axial sliding of the rollers such that unfavorable roller edge loads and stress may be avoided.

According to an exemplifying embodiment, the outer raceway comprises a transverse raceway radius and a circumferential raceway radius. In more detail, the transverse raceway radius may be defined as the radius of the outer raceway in the direction transverse rolling direction of the rollers. Furthermore, the circumferential raceway radius may be defined as the radius of the outer raceway in the rolling direction of the rollers in the contact point between a roller and the outer raceway.

Furthermore, according to an exemplifying embodiment, the transverse raceway radius is between 1.65 and 1.0 times the circumferential raceway radius, or between 1.62 and 1.02 times the circumferential raceway radius. Thereby, ratios providing design rules allowing for more compact and efficient bearings, with reduced over-dimensioning, both in terms of load capacity and external dimension of the bearing, is achieved.

Also, this ratio regime between the transverse and circumferential raceway radius is advantageous in that is allows for a positive offset transverse radius design of the bearing, wherein the transverse raceway radius is more than the circumferential raceway radius. In other words, the toroidal geometry of the curvature of the bearing raceways is arranged such that the outer ring transverse raceway radius center point extends beyond the center axis line of the bearing.

According to yet an exemplifying embodiment, the transverse raceway radius is less than 1.0 times the circumferential raceway radius, or less than 1.02 times the circumferential raceway radius. This ratio regime between the transverse and circumferential raceway radius allows for a negative offset transverse radius design of the bearing, wherein the transverse raceway radius is less than the circumferential raceway radius. In other words, the toroidal geometry of the curvature of the bearing raceways is arranged such that the outer ring transverse raceway radius center point does not reach the center axis line of the bearing. According to a further embodiment, the transverse raceway radius is less than 1.0 times the circumferential raceway radius, but not less or equal to 50% of the roller length 'lw', or not less or equal to 60% of the roller length 'lw'.

According to an exemplifying embodiment, the contact angle is between 10 and 45 degrees, or between 15 and 35 degrees. The contact angle may be defined as the angle of the line along which the resulting load is transmitted via a roller element from one raceway to another, typically along an axial center portion of the roller, in relation to the normal direction of the bearing center axis. The contact angle is key for providing sufficiently high axial load carrying capacity of the bearing.

According to various arrangement comprising embodiments of the bearing, the bearing may be arranged with a positive internal operational clearance, negative internal operational clearance, or no internal operational clearance. For example, depending on the preferred design of the application, the rolling elements may have no axial play in relation to the raceways of the inner and outer rings, or the rolling elements may be arranged with a suitable play in the radial and axial direction in relation to the raceways of the inner and outer rings. The bearings may alternatively be arranged with a negative operational clearance, i.e. a preload, in order to e.g. enhance the stiffness of the bearing arrangement or to increase running accuracy. For example, the application of a preload may be provided by springs, or by solution involving hydraulic pressure devices.

According to a further aspect thereof, the present invention relates to a method for determining dimensional parameters of structural members of an angular contact self-aligning toroidal rolling element bearing for an application, the bearing having rolling elements formed of rollers arranged between an inner ring and an outer ring. The method comprises receiving a first input representative of required load carrying characteristics associated with the application. Furthermore, the method comprises, determining, based on the first input:
- a contact angle for the angular contact self-aligning toroidal rolling element bearing,
- a first dimensional parameter representative of a transverse radius 'rw' for the rollers, and
- a second dimensional parameter representative of a roller length 'lw', wherein the first and second dimensional parameter are determined based on a ratio between the roller transverse radius and roller length.

The method for determining the dimensional parameters, and embodiments thereof, advantageously allow for determination of bearings having the same advantageous effects and benefits as described in relation to the first aspect of the invention. In more detail, improved bearings for applications involving high axial loads, misalignment and shaft deflections may be provided by determining improved dimensional parameters of structural members of the angular contact self-aligning toroidal roller bearing. In particular, by focusing the design on allowing for self-orientation of the rollers based on the ratio between the roller transverse radius and roller length, more compact and efficient bearing solutions may be achieved. By focusing on the ratio between the roller transverse radius and roller length, the bearing design may be optimized in relation to axial self-orientation of the rollers, and previous design rules for toroidal bearings may be alleviated. This allows for reductions of over-dimensioning in terms of load capacity and external dimensions of the bearing and its structural members. The method may for example be used by design engineer for determining suitable bearing dimension for a given application having predetermined properties, such bearing outer ring diameter, or inner ring bore diameter, etc.

According to an exemplifying embodiment, the method comprises determining a contact angle between 10 and 45 degrees, or between 15 and 35 degrees.

According to an exemplifying embodiment, the method further comprises determining the ratio between the roller transverse radius and roller length, such that each roller is arranged to self orient in its axial direction in relation to the inner and outer rings in a loaded zone during operation. According to an exemplifying embodiment, the ratio, for each roller in the bearing, is less than 12, or is less than 10, or less than 8.5, or less than 6, or less than 4.

According to an exemplifying embodiment, the method further comprises specifying, a transverse raceway radius of the outer raceway, and a circumferential raceway radius of the outer raceway. For example, according to an exemplifying embodiment, the method comprises specifying that the transverse raceway radius is between 1.65 and 1.0 times the circumferential raceway radius, or between 1.62 and 1.02. According to an alternative exemplifying embodiment, the method comprises specifying that the transverse raceway radius is less than 1.0 times the circumferential raceway radius, or less than 1.02. Thereby, a positive or a negative transverse bearing design of the bearing may be provided, respectively.

According to an exemplifying embodiment, the method is a computer-implemented method, which method is performed by one or more processors of a computing device. Also, the present invention relates to a computer-readable medium containing instructions that, when executed by a computing device, cause the computing device to perform the computer-implemented method of any one of the embodiments described herein. Furthermore, according to an exemplifying embodiment, the computer-implemented method comprises outputting a representation of the first and/or second dimensional parameter. It may e.g. be outputted on a display our outputted to a bearing manufacturing control unit.

According to a further aspect thereof, the present invention relates to a method for manufacturing an angular contact self-aligning toroidal rolling element bearing, comprising an inner ring, an outer ring, and a set of rolling elements formed of rollers arranged in an intermediate configuration between the inner and outer rings, the method comprises providing each roller with a curved raceway-contacting surface for being in load carrying contact with a curved inner raceway of the inner ring and in load carrying contact with a curved outer raceway of the outer ring, wherein the curvature of the raceway-contacting surface of each roller and the curvature of the inner and outer raceway is adapted such that each roller self orient in its axial direction in relation to the inner and outer rings. The method for manufacturing the bearing is advantageous in similar manner as described in relation to the first and second aspects of the invention. According to various embodiments, the method may further comprises manufacturing a bearing according to any one of the embodiments described in relation to the first and second aspects of the invention.

The angular contact toroidal roller bearing is advantageous in that it can accommodate both radial loads and axial loads. This is due to the optimized design of the rings combined with the design and number of rollers. For example, it may be used in a face-to-face or back-to-back arrangement with another bearing taking up the axial load in the other direction. Due to their robust design, toroidal bearings can cope with small deformations and machining errors of the bearing seat. The rings accommodate these small imperfections without the danger of roller edge stresses. The high load carrying capacity plus the ability to compensate for small manufacturing or installation errors provide opportunities to increase machine productivity and uptime. Together with high axial load carrying capacity of the angular contact toroidal rolling element bearing, this means that for the same bearing size in an application arrangement, performance can be increased and/or or service life extended. Also, new machine designs can be made more compact to provide the same, or even better performance.

Generally, other objectives, features, and advantages of the present invention will appear from the following detailed disclosure, from the attached dependent claims as well as from the drawings are equally possible within the scope of the invention.

BRIEF DESCRIPTION OF DRAWINGS

Embodiments of the invention will now be described, by way of example, with reference to the accompanying drawings, wherein.

Figure 1:
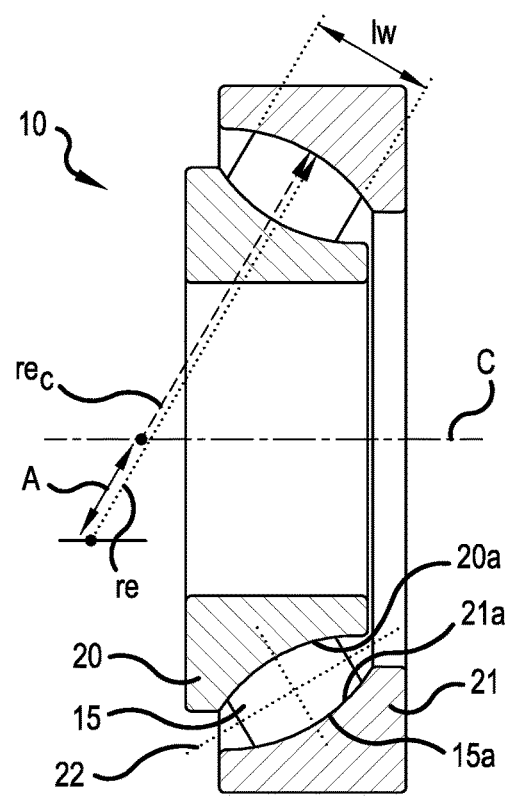
FIG. 1 is a schematic cross-sectional view of an exemplifying embodiment of the angular contact self-aligning toroidal roller bearing according to the present invention.

It should be understood that the drawings are not true to scale and, as is readily appreciated by a person skilled in the art, dimensions other than those illustrated in the drawings are equally possible within the scope of the invention.

DETAILED DESCRIPTION OF EMBODIMENTS OF THE INVENTION

In the drawings, similar, or equal elements are referred to by equal reference numerals.

In FIG. 1, a schematic cross-sectional view of an exemplifying embodiment of the angular contact self-aligning toroidal roller bearing 10 according to the present invention is shown.

Figure 2:
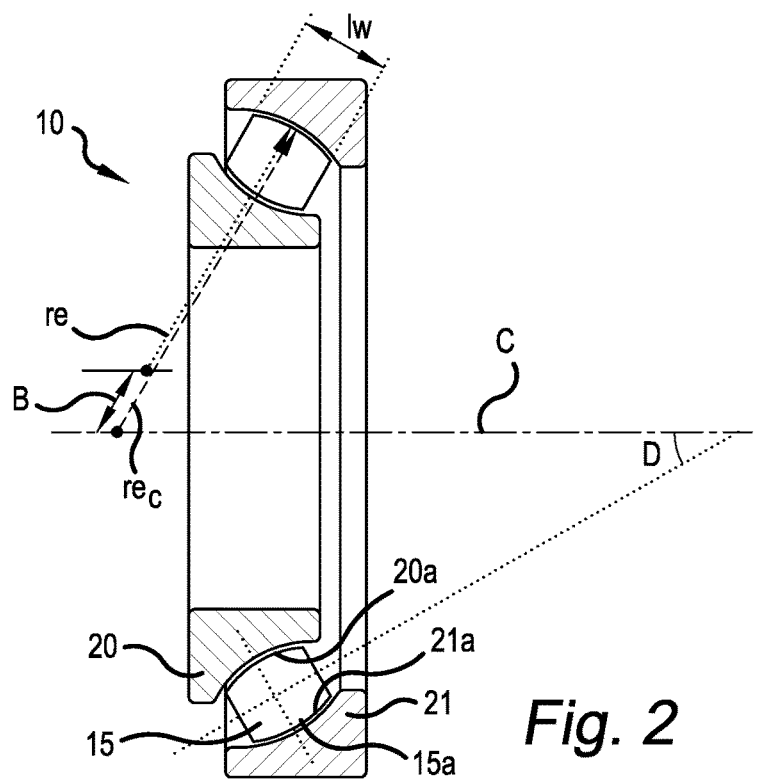
FIG. 2 is a schematic cross-sectional view of an exemplifying embodiment of the angular contact self-aligning toroidal roller bearing according to the present invention.

In FIG. 2, a schematic cross-sectional view of an exemplifying embodiment of the angular contact self-aligning toroidal roller bearing 10 according to the present invention is shown.

Each one of the bearing 10 illustrated in FIG. 1 and FIG. 2 comprises an inner ring 20, an outer ring 21, and a set of rolling elements formed of symmetric rollers 15 arranged in an intermediate configuration between the inner and outer rings 20 and 21. Each roller 15 of the angular contact self-aligning rolling element bearing is an axially symmetrical bearing roller. As shown, the bearing 10 is a single row rolling element bearing.

Furthermore, each roller 15 has a curved raceway-contacting surface 15a arranged in contact with a curved inner raceway 20a of the inner ring 20, and in contact with a curved outer raceway 21a of the outer ring 21. As shown, the contact angle between each roller 15 and the inner raceway 20a and the outer raceway 21a is inclined in relation to a bearing axis C, as indicated by D in FIG. 2. The toroidal curvature of the curved raceway-contacting surface 15a of each roller 15 and the toroidal curvature of the inner and outer raceways 20a and 21a are adapted to allow for self-orientation of the rollers in the axial direction 22 of the rollers. The toroidal curvature of the curved raceway-contacting surface 15a of each roller 15 corresponds to the toroidal curvature of the inner and outer raceways 20a and 21a. The transverse raceway radius, characteristics for the toroidal geometry, of the outer raceway 21a is indicated by re. As illustrated, the transverse raceway radius re is offset in relation to the bearing axis C and the radius of the outer ring raceway 21a, as indicated by A and B, respectively. Roller axial length is indicated by lw.

Figure 4:
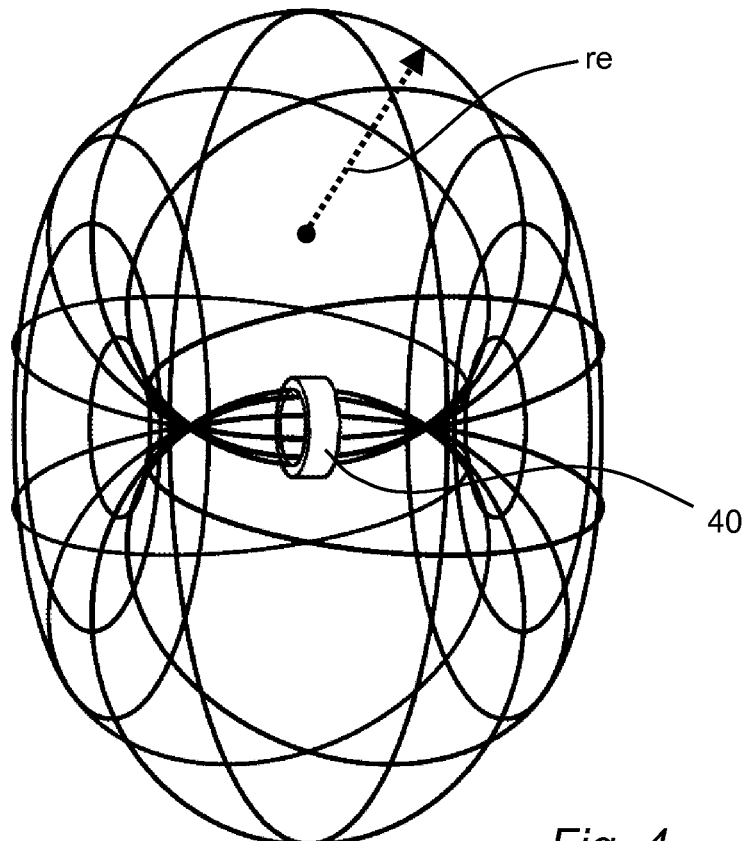
FIG. 4 is a schematic view of a torus shape in combination with a rolling element bearing.

Each one the illustrated bearings 10 in FIG. 1 and FIG. 2 is a single row roller bearing 10 with relatively long, slightly crowned rollers. The inner and outer ring raceways 20a and 21a are correspondingly concave and symmetrical. The outer ring raceway geometry is based on a torus, as schematically illustrated in FIG. 4, hence the term toroidal roller bearing. The angular contact toroidal roller bearing is designed as a locating bearing that allows for self-aligning ability, similar to the ability of a spherical roller bearing, and ability to allow for twisting displacements, such as twisting of any one or both of the rings and/or housing structure. Self-aligning capability and ability to allow for twisting displacement is for example particularly important in applications where there is misalignment as a result of inaccurate manufacturing, mounting errors or shaft deflections. To compensate for these conditions, the bearing 10 may for example be arranged to accommodate misalignment up to 0.5 degrees between the bearing rings 20 and 21 without any detrimental effects on the bearing or bearing service life. Further advantages are that the bearing run cooler, the lubricant lasts longer and maintenance intervals can be appreciably extended.

With reference to FIG. 1, the transverse raceway radius re of the outer raceway is between 1.62 and 1.0 times the outer ring circumferential raceway radius $re_c$. This ratio allows for a positive offset transverse radius design toroidal bearing, wherein the transverse raceway radius re is greater than the outer ring circumferential raceway radius $re_c$, within a limited interval. In other words, the toroidal geometry of the curvature of the bearing raceways 20a and 21a as well as the rollers 15a, are arranged such that the transverse raceway radius re center point reaches over the center axis line C of the bearing 10. As shown, the transverse raceway radius re center point is located beyond the bearing axis line C by distance A.

With reference to FIG. 2, the transverse raceway radius re of the outer raceway 21a is less than 1.0 times the outer ring circumferential raceway radius $re_c$. This ratio allows for a negative offset transverse radius design toroidal bearing, wherein the transverse raceway radius re is less than the outer ring circumferential raceway radius $re_c$. In other words, the toroidal geometry of the curvature of the bearing raceways 20a and 21a as well as the rollers 15a are arranged such that the transverse raceway radius re center point does not reach the center axis line C of the bearing 10. As shown, the transverse raceway radius re center point is located before the bearing axis line C by distance B.

Figure 3:
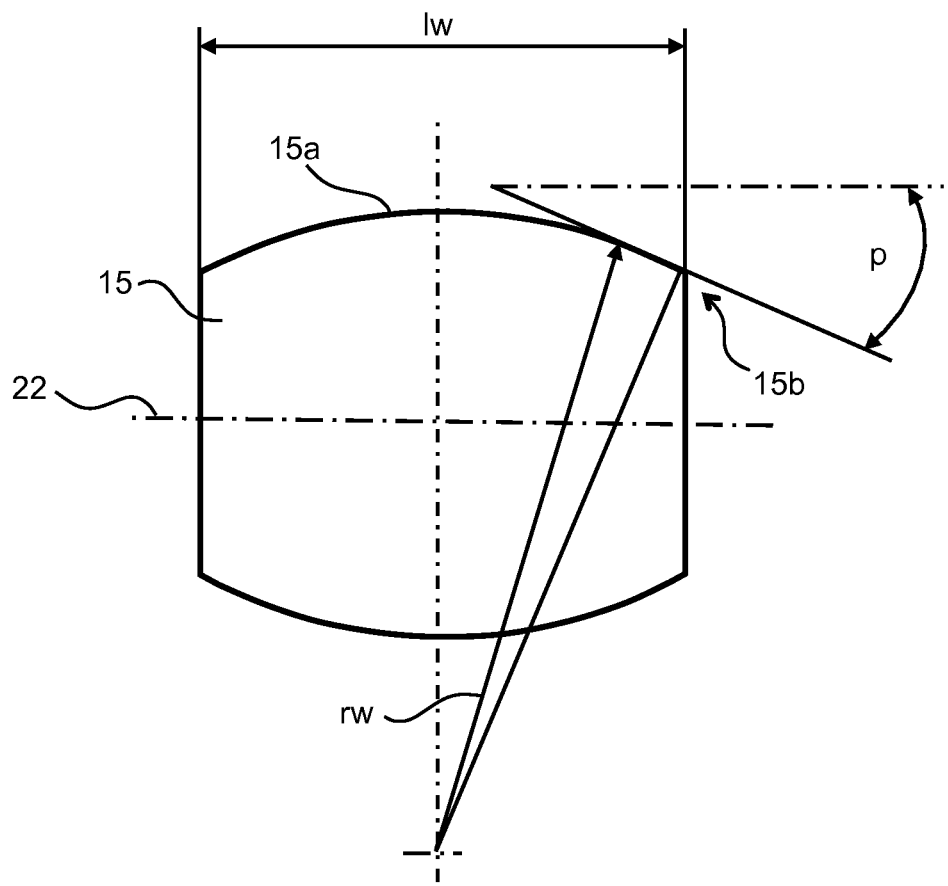
FIG. 3 is a schematic partial cross-sectional view of an exemplifying embodiment of the angular contact self-aligning toroidal roller bearing according to the present invention

In FIG. 3, a schematic partial cross-sectional view of an exemplifying embodiment of the angular contact self-aligning toroidal roller bearing according to the present invention is shown. More specifically, an axially symmetric roller 15 of an angular contact self-aligning toroidal roller bearing is shown, having raceway contacting surface 15a, roller end 15b, roller axis 22, transverse radius rw, roller length lw, and friction based angle p at the roller end 15b.

The axial self-orientation is dependent on the curvature geometries of the bearing, and a self-locking limit, wherein the axial self-orientation of the rollers is prevented, may be determined based on the existing friction characteristics and geometries at the roller axial end 15b.

The following relationships are valid, wherein mu is representative of a coefficient of friction between the raceway contacting surface of the roller 15 and the raceway of the bearing:

$$mu(\text{limit}) < \tan(p)$$

Wherein the friction based angle p at the roller end may be defined as:

$$p = \arcsin((lw/2)/rw)$$

EXAMPLE

According to an exemplifying example (approx.):
if mu(limit) is 0.05 (depending on e.g. material properties, bearing operation parameters, etc.), and roller length lw=195 mm, then the roller transverse radius should be less than approx. 1950 mm for ensuring axial self-orientation of the roller during operation. The approximated transverse radius limit rw<1950 mm corresponds to a ratio between the roller transverse radius rw and roller length lw of 10. This ratio is bearing pitch diameter independent. Lower ratio provides increased self-orientation ability of the rollers, such as less than 8.5, or less than 6, or less than 4.

In FIG. 4, a schematic view of a torus shape in combination with a rolling element bearing 40 is shown. As shown, the curvature of the bearing raceways forms a torus geometry. The illustrated bearing 40 is a toroidal bearing with zero contact angle.

Figure 5:
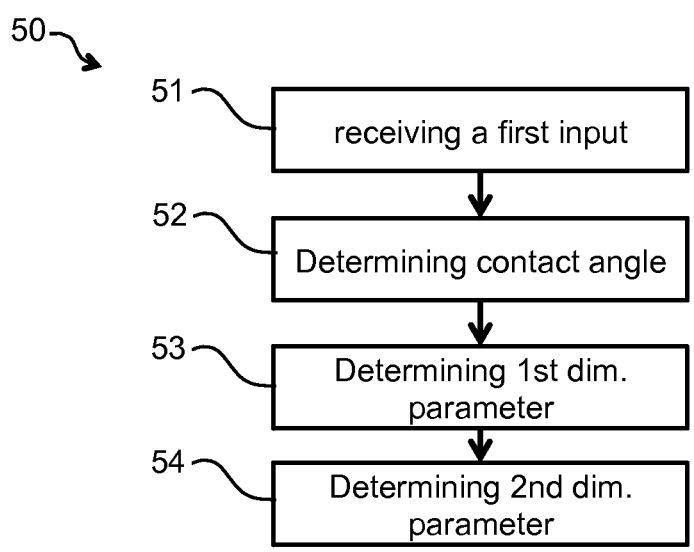
FIG. 5 is a schematic flow chart of an embodiment of a method according to the present invention.

In FIG. 5, a schematic flow chart of an embodiment of the method 50 according to the present invention is shown. As illustrated, the method 50 comprises a step 51 comprises receiving a first input representative of required load carrying characteristics associated with the application. Furthermore, the method comprises the step 52, 53, and 54, which steps comprise determining different features of the bearing based on the first input. In more detail, step 52 comprises determining a contact angle for the angular contact self-aligning toroidal rolling element bearing, step 53 comprises determining a first dimensional parameter representative of a transverse radius rw for the rollers, and step 54 comprises determining a second dimensional parameter representative of a roller length lw, wherein the first and second dimensional parameter are determined based on a ratio between the roller transverse radius and roller length.

According to an exemplifying implementation of the method depicted in FIG. 5, the dimensional parameters of the structural members of an angular contact self-aligning toroidal rolling element bearing for a specific application may be determined based on various input parameters representative of required load carrying characteristics associated with the specific application. For example, the first input may comprise any one or more of the following input parameters:

D, outer diameter of the bearing, or the diameter of the bearing housing,
d, diameter of the axle, or the bore of the bearing,
P, the load.

The method may further comprise determination of any one or more of the following additional parameters:

Dw, height roller element,
z, number of rolling elements in the bearing,
dm, pitch diameter of the bearing, According to various embodiments, any one or all of the above input parameters D, d, and P and the determined parameters Dw, z, and dm may advantageously be used as a base for determining the first and second dimensional parameters representative of the transverse radius rw and the roller length lw, respectively.

It is noted that the transverse radius of the raceways, such as the transverse raceway radius of the outer raceway re, typically corresponds to the transverse radius of the roller rw based on a suitable ratio, also known as osculation. The level of correspondence, i.e. the osculation ration rw/re, between the roller and raceway transvers radius may for example be about 0.98, or between 0.965 and 0.995.

It should be noted that the invention has mainly been described above with reference to a few embodiments. However, as is readily appreciated by a person skilled in the art, other embodiments than the ones disclosed above are equally possible within the scope of the invention, as defined by the appended patent claims.

For example, even though the angular contact self-aligning toroidal rolling element bearing has been mainly been described in relation to a stand alone configuration, it may be utilized in a wide range of applications, including but not limited to turbines, mills, and other machines including rotating shafts with axial and radial support requirements.

In the claims, the word "comprising" does not exclude other elements or steps, and the indefinite article "a" or "an" does not exclude a plurality. A single apparatus or other unit may fulfill the functions of several items recited in the claims. The mere fact that certain features or method steps are recited in mutually different dependent claims does not indicate that a combination of these features or steps cannot be used to advantage.

What is claimed is:

1. An angular contact self-aligning toroidal rolling element bearing, comprising:
   an inner ring;
   an outer ring; and
   a set of rolling elements formed of rollers arranged in an intermediate configuration between the inner ring and the outer ring,
   wherein each roller has a curved raceway-contacting surface arranged for being in load carrying contact with a curved inner raceway of the inner ring and in load carrying contact with a curved outer raceway of the outer ring,
   wherein a contact angle between each roller and at least one of the inner raceway and outer raceway is inclined in relation to a bearing axis,
   wherein each roller is arranged to self orient in its axial direction in relation to the inner ring and the outer in a loaded zone during operation,
   wherein each roller has a roller transverse radius and a roller length, and
   wherein a ratio between the roller transverse radius and roller length, for each roller, is less than 6.

2. The rolling element bearing according to claim 1, wherein
   the ratio between the roller transverse radius and roller length, for each roller, is less than 4.

3. The rolling element bearing according to claim 1, the outer raceway further comprising a transverse raceway radius, defined as a radius of the outer raceway in a direction transverse to a rolling direction of the rollers, and a circumferential raceway radius, defined as a radius of the outer raceway in the rolling direction of the rollers at a contact point between the rollers and the outer raceway.

4. The rolling element bearing according to claim 3, wherein the transverse raceway radius is between 1.65 and 1.0 times the circumferential raceway radius.

5. The rolling element bearing according to claim 3, wherein the transverse raceway radius is between 1.62 and 1.02 times the circumferential raceway radius.

6. The rolling element bearing according to claim 3, wherein the transverse raceway radius is less than 1.0 times the circumferential raceway radius.

7. The rolling element bearing according to claim 1, wherein the contact angle is between 10 and 45 degrees.

8. The rolling element bearing according to claim 1, wherein the contact angle is between 15 and 35 degrees.

9. The rolling element bearing according to claim 1, wherein an osculation ratio between each roller and a raceway transverse radius is between 0.965 and 0.995.

10. An angular contact self-aligning toroidal rolling element bearing, comprising:
    an inner ring;
    an outer ring; and
    a set of rolling elements formed of rollers arranged in an intermediate configuration between the inner ring and the outer ring,
    wherein each roller has a curved raceway-contacting surface arranged for being in load carrying contact with a curved inner raceway of the inner ring and in load carrying contact with a curved outer raceway of the outer ring,
    wherein a contact angle between each roller and at least one of the inner raceway and outer raceway is inclined in relation to a bearing axis, and
    wherein each roller is arranged to self orient in its axial direction in relation to the inner ring and the outer in a loaded zone during operation,
    the outer raceway further comprising a transverse raceway radius, defined as a radius of the outer raceway in a direction transverse to a rolling direction of the rollers, and a circumferential raceway radius, defined as a radius of the outer raceway in the rolling direction of the rollers at a contact point between the rollers and the outer raceway, and
    wherein the transverse raceway radius is less than 1.0 times the circumferential raceway radius.

11. The rolling element bearing according to claim 10, wherein each roller has a roller transverse radius and a roller length and wherein a ratio between the roller transverse radius and the roller length, for each roller, is less than 12.

12. The rolling element bearing according to claim 10, wherein each roller has a roller transverse radius and a roller length and wherein a ratio between the roller transverse radius and the roller length, for each roller, is less than 4.

13. The rolling element bearing according to claim 10, wherein an osculation ratio between each roller and the transverse raceway radius is between 0.965 and 0.995.

* * * * *